United States Patent
Conti et al.

(10) Patent No.: US 8,025,920 B2
(45) Date of Patent: Sep. 27, 2011

(54) BIPOLAR UNIT FOR FUEL CELL PROVIDED WITH POROUS CURRENT COLLECTORS

(75) Inventors: Amedeo Conti, Mariano Comense (IT); Antonino Toro, Segrate (IT)

(73) Assignee: Nuvera Fuel Cells Europe S.R.L., S. Donato Milanese (IT)

(*) Notice: Subject to any disclaimer, the term of this patent is extended or adjusted under 35 U.S.C. 154(b) by 0 days.

(21) Appl. No.: 12/839,080

(22) Filed: Jul. 19, 2010

(65) Prior Publication Data

US 2010/0281682 A1    Nov. 11, 2010

Related U.S. Application Data

(62) Division of application No. 11/667,210, filed as application No. PCT/EP2007/051133 on Feb. 6, 2007, now Pat. No. 7,955,753.

(51) Int. Cl.
*H01M 8/02* (2006.01)
*H01M 8/10* (2006.01)

(52) U.S. Cl. ........................................ 427/115; 429/457

(58) Field of Classification Search .................. 427/115; 429/457

See application file for complete search history.

(56) References Cited

U.S. PATENT DOCUMENTS

| 5,482,792 A | 1/1996 | Faita et al. |
| 5,981,098 A | 11/1999 | Vitale |
| 6,099,984 A | 8/2000 | Rock |
| 2002/0102453 A1* | 8/2002 | Suenaga et al. ............... 429/37 |

FOREIGN PATENT DOCUMENTS

| EP | 1 237 215 A2 | 9/2002 |
| JP | 2000208153 A * | 7/2000 |
| WO | WO 2005/031900 A2 | 4/2005 |

OTHER PUBLICATIONS

European Patent Office International Search Report from International Application No. PCT/EP2007/051133 dated May 16, 2007.

* cited by examiner

*Primary Examiner* — Gregg Cantelmo
(74) *Attorney, Agent, or Firm* — Finnegan, Henderson, Farabow, Garrett & Dunner, LLP

(57) ABSTRACT

The invention describes a bipolar unit consisting of a pair of metal plates at least one of which is corrugated, fixed by continuous and hydraulically impervious connections, and provided on the external surfaces thereof with porous electric current collectors also suitable for the distribution of the gaseous reactants. The collector facing the plate corrugations is interpenetrated therein, thereby achieving a continuous contact. Two bipolar units of the invention and one interposed MEA element are assembled to form an elementary fuel cell with an improved electric current distribution. Furthermore the channels formed between the mutually contacting surfaces of the plate pair by the corrugations of at least one of the plates of each bipolar unit, are crossed by a coolant allowing to optimally adjust the cell operative temperature.

4 Claims, 5 Drawing Sheets

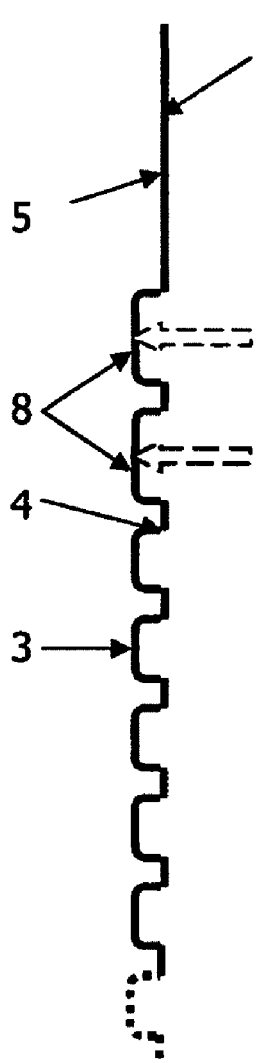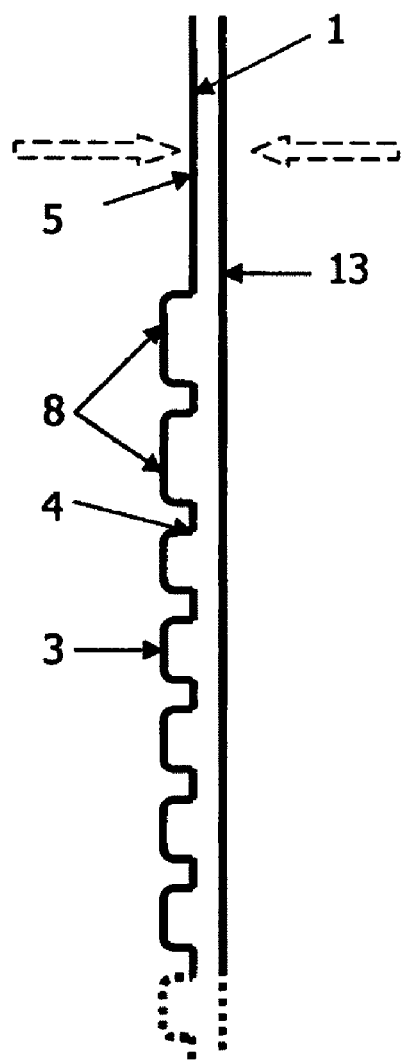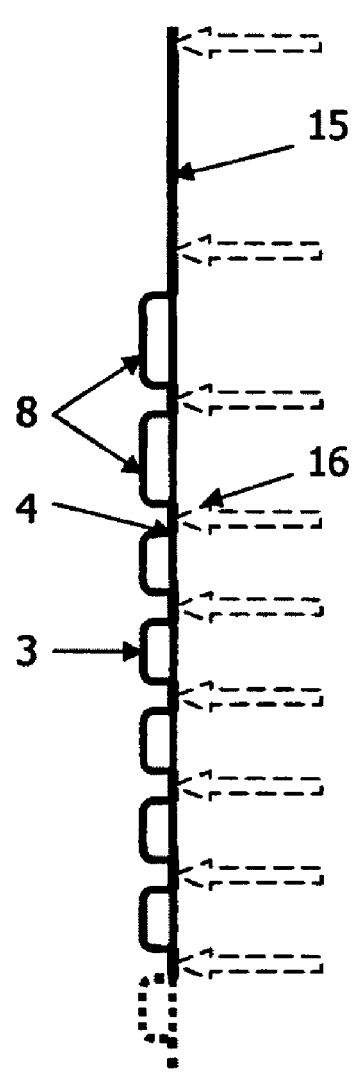

BIPOLAR UNIT FOR FUEL CELL PROVIDED WITH POROUS CURRENT COLLECTORS

This is a divisional application of U.S. application Ser. No. 11/667,210, filed May 7, 2007, which claims priority to Application No. PCT/EP2007/051133 filed Feb. 6, 2007, both of which are incorporated herein by reference in their entirety.

Fuel cells are long known as a direct conversion device of the chemical energy of combination of gaseous reactants, more particularly of a fuel such as hydrogen and an oxidant such as air, into electrical energy. Fuel cells are therefore not subject to the known limitation of Carnot's cycle and are characterised by a remarkably high efficiency in comparison with that of the conventional devices for the production of electrical energy in which an intermediate thermal stage is present.

Among the various known types, the ionomer membrane fuel cell (PEMFC, from Proton Exchange Membrane Fuel Cell) has earned a special consideration for the capability of responding to quick power demands and for the simplicity of the required auxiliaries, particularly appreciated for electric vehicle applications. The PEMFC consists of an electrochemical unit comprising an ionomer membrane, of the perfluorinated type as known in the art and as commercialised for instance by DuPont, USA under the trade-mark Nafion® or of the hydrocarbon type based on monomers derived from polymeric structures such as polystyrene, polyetheretherketones, polybenzimidazol, on whose faces are applied two electrodes, anode (negatively charged) and cathode (positively charged), in form of porous films containing suitable catalysts. The combination of the membrane with the porous electrodic films is usually indicated with the acronym CCM (from Catalyst-Coated Membrane). The external surfaces of the electrodes are in contact in their turn with conductive porous layers, known as diffusion layers, suited to establish a homogeneous distribution of the gaseous reactants on the catalytic films. The overall element resulting from the CCM associated with the diffusion layers (known to the experts in the field with the acronym MEA, from Membrane-Electrode Assembly) is inserted between two planar conductive structures, directed to ensure both the electric current uniform distribution and the supply of the reactants to the diffusion layers: such structures are known in the art as collectors and, depending on the manufacturing technique, may consist of plates provided with suitable grooves or projections, for instance as proposed in U.S. Pat. No. 6,274,262, or by layers characterised by high porosity, as claimed in U.S. Pat. No. 5,482,792. The MEA and the relevant collectors, together with suitable sealing gaskets, are finally enclosed between a pair of bipolar plates, consisting of two suitable shaped sheets, impervious to the reactants and endowed with electrical conductivity. According to some types of technology the bipolar plates may also be integrated with the collectors to form a single object, as disclosed in the above cited document U.S. Pat. No. 6,274,262. The fuel and the oxidant are supplied through suitable openings obtained in the bipolar plates and are respectively distributed to the anode and to the cathode through the collectors and the diffusion layers of the MEA element. The fuel, for example hydrogen, is oxidised with generation of protons and electrons. Protons migrate across the ionomer membrane and participate to the reduction reaction of the oxygen of the air with formation of water. The electrons required for the reduction come from the anode through the external electrical energy appliance circuit. The migration of protons requires that the ionomer membrane be maintained in a fully hydrated condition, which may be accomplished either by humidifying the gaseous reactants before their admission or by directly injecting water into each of the stack cells. The conversion efficiency of the chemical energy of reaction into electrical energy, although substantially higher than that of the conventional generators, is largely below 100%: the fraction of chemical energy not converted into electrical energy is dissipated as thermal energy which has to be withdrawn by means of a suitable cooling device to maintain the cell internal temperature typically around 60-100° C. The cooling device is preferably of the forced air-type for the small power systems and of demineralised water or diathermic liquid (hereafter generically indicated as coolant) circulation-type for systems of higher power. In the latter case the cooling is normally carried out by making the coolant flow along at least one of the bipolar plates. Since the electric voltage of a single cell under load is modest, in the order of 0.7-0.8 Volts, the high voltages normally required by the appliance systems are obtained by assembling a multiplicity of single PEMFCs intercalated with the cooling devices in blocks (stacks in the following, as commonly known to the experts in the field).

The given description, although necessarily in brief, demonstrates how complex a PEMFC stack structure is and hints at how difficult it is to obtain compact stacks as required in vehicular applications in which reaching a high power density matters, not only in terms of kW/l but also of kW/kg: since the volume and weight of the MEA unit is very reduced, this target is substantially affected by the design and the materials employed for the production of the bipolar plates and collectors. A further complication typical of vehicular applications is given by the peak power demands to which corresponds a high current intensity generation: in order to avoid that damages to the catalytic film activity take place in these conditions, it is fundamental that such currents be evenly distributed on the surface of MEA units. The prior art proposes on this regard bipolar plate and collector structures which do not allow to manufacture stacks with satisfactory power densities, in particular with power densities suitable for use on vehicles and/or to achieve the desired uniformity in current distribution.

U.S. Pat. No. 6,132,895 discloses metal bipolar plates with a typical thickness of 1-2 mm and provided with grooves or both sides obtained by means of photolithography, or laser radiation etching or microabrasion. The plates are coupled to intercalated MEA units with the reactants gases flowing through the grooves. To decrease the overall volume, the resulting stack is free of cooling devices and the operating temperature control is obtained by feeding air in a strong excess with respect to the reaction stoichiometry requirement: the generated heat is absorbed by the flowing air and extracted from the stack. The described solution reduces the volumes but only in part, considering the thicknesses in any case required to manufacture the bipolar plates, and at any rate at the cost of a strong operative criticality associated with the easy membrane dehydration induced by high gas flowrates: such risk is so high, particularly at high output regimes, that is common practice to employ a coolant for withdrawing the heat generated during operation. Furthermore only the apexes of the external grooves are put in contact with the surfaces of the MEA unit diffusion layers during the assembly of a stack. This type of assembly implies a few remarkably serious problems. Firstly, the desired uniformity in the current distribution is not achieved: in fact, the diffusion layer alone is not capable of ensuring such an important function in view of the reduced thickness and the relatively modest electrical conductivity. Secondly, the localised contact on the apexes of the grooves implies an increase in the mechanical solicitation when stacks are tightened, with substantial risks of damaging delicate components such as the ionomer membranes and the diffusion layers themselves. Finally it is apparent that the gaseous reactants are subject to stagnation in the contact zones between diffusion layers and groove apexes: here the fresh gas supply to the catalytic films is slowed down by the necessary lateral diffusion, which is not negligible in view of the lesser porosity generated by the higher compression.

US 2002/0168561 proposes the use of thin metal bipolar plates wherein the grooves are generated by corrugations obtained by cheaper mechanical moulding processes. While this finding solves the cost problems negatively affecting U.S. Pat. No. 6,132,895, it certainly does not overcome the problem of current distribution unevenness and of the slowed diffusion in the contact zones of MEA units with the corrugation apexes.

US 2001/0008719 discloses metal plates, respectively cathodic and anodic, provided on both sides with projections obtained by a process of continuous mechanical deep-drawing. The cathodic and anodic plates are respectively fastened in pairs so as to bring facing projections in contact: an internal space crossed by a suitable coolant during operation is thereby defined. The object formed in this way can be defined for the sake of simplicity as a bipolar unit, the external projections whereof are put in contact with the diffusion layers of the MEA units during the assembly of a stack. It is thus evident that the type of construction, while allowing to obtain good power densities, is not capable as already discussed to achieve the desired current distribution uniformity not to prevent the slowed diffusion in the contact zones between MEA units and projection apexes.

In EP 1 504 481 there is disclosed the use of smooth cathodic and anodic metal plates and of separate collectors consisting of highly conductive porous layers. Similarly to what has been reported in the case of the previous document, the coupling of the components leads to the formation of a bipolar unit consisting in succession of a first external collector (for instance cathodic collector), a plate, an internal collector (directed to define an internal space for the circulation of a coolant), a plate, a second external collector (for instance anodic collector). When assembling multiplicities of bipolar units and MEAs for producing stacks, both the external and the internal collectors ensure a uniform contact with the metal plate and MEA unit surfaces: therefore it can be said that the stacks comprising the above disclosed bipolar units are characterised by an improved electric current distribution also in high output situations, besides the elimination of mechanical shaping procedures given the fact that the components are directly available on the market. Nevertheless, this stack turns out not to be completely satisfactory under the standpoint of power densities, which seldom reach the required values in view of the amount of elementary pieces involved. Moreover, since in each bipolar unit are present, during operation, no less than six contact surfaces (respectively MEA-first collector, first collector-plate, plate-internal collector, plate-second collector, second collector-MEA), the effective performances may be negatively affected with the functioning time by the formation of low-conductivity oxides, as occurs with stainless steels, nickel alloys and titanium currently used for the production of plates and collectors.

The above cited U.S. Pat. No. 6,274,262 proposes a bipolar unit comprising a cathode plate and an anode plate provided with grooves on the external surface and a central plate with grooves on both faces: the tightening of the three elements allows creating internal channels for the passage of a coolant. A multiplicity of bipolar units of this kind is assembled with the required MEA elements intercalated thereto to form a stack in which the gaseous reactants flow during operation in the channels defined by the grooves present on the external surfaces of the cathodic and anodic plates and by the facing MEA elements.

The sealing of the internal channels requires the surfaces to have extremely strict planarity tolerances only obtainable by precision procedures characterised by production costs not compatible with commercial applications, especially in the automotive field, and by the need to resort to sensible thicknesses with a negative consequence on the achievable power density values. Furthermore the bipolar unit design with grooves in contact with the MEA units introduces, as seen above, problems of electric current distribution and of slowed diffusion in the contact zones, especially serious in high output conditions. Finally, the number of contact surfaces introduces the previously discussed risk of performance decay associated with the superficial oxide growth.

US 2005/0170232 proposes a bipolar unit structure equivalent to the one of the previous document characterised by applying an adhesive film to the groove apexes: in this way, not only a monolithic object easier to handle in the stack assembly phase is obtained, but the electrical contact between MEA and bipolar unit is also stabilised since the adhesive prevents detachments between the groove apexes and the facing MEA element surfaces and protects the contact point from the action of aggressive agents. This finding allows to maintain performances more stable in time, but it doesn't prove by any means advantageous as regards the problem of electric current distribution unevenness and of the slowed diffusion in the contact zones between MEA unit and groove apexes.

US 2003/0049515 discloses a bipolar unit consisting of cathodic and anodic plates obtained from metal sheets whereon projections are produced by deep-drawing on both faces, and of a central metal plate: the assembly of the three components allows creating an internal space for the passage of a coolant. The use of three plates to form the bipolar unit involves complications in achieving high power densities, and furthermore the point contact between projections and MEA elements leads back to the above problems of current distribution unevenness, slowed diffusion and possible decay in time of the performances associated to the number of interfaces.

U.S. Pat. No. 5,858,567 proposes to overcome the difficulties generated by the simple mechanical contact between various surfaces by aid of a bipolar unit consisting of an assembly of metal leaflets suitably provided with grooves on their surfaces and integrated to form a monolithic object by welding under vacuum. To limit the thickness and weight of the bipolar unit as required in order to achieve the target of high power densities, the leaflets are obtained out of thin sheets whereon the various types of grooves are obtained by photolithography followed by chemical etching. The resulting bipolar unit typically has a thickness of 2.5 mm allowing to produce stacks with good power density. Since also in this case the contact is realised between apexes of the external grooves and MEA element surfaces, also the bipolar unit of U.S. Pat. No. 5,858,567 remains affected by the problem associated with the current distribution and the slowed diffusion in the contact zones.

In conclusion, the overview of the prior art demonstrates that the constructive solutions proposed until now are not capable of simultaneously solving the two problems of high power densities and uniform electric current distribution, particularly at high output regime.

Under a first aspect, the present invention has the scope of providing a fuel cell bipolar unit overcoming the limitations of the prior art.

Under a second aspect, the present invention has the scope of providing a fuel cell delimited by a pair of bipolar units overcoming the limitations of the prior art.

These and other objects will be clarified by the following description and by the appended figures, which are not to be intended as limiting the invention.

The invention consists of a fuel cell bipolar unit delimited by a pair of metal plates, each provided with an internal surface and an external surface, whose internal surfaces are maintained in mutual contact by means of relevant connections; the plates of the bipolar units are also provided with corrugations and openings suitable for ensuring the circulation of the gaseous reactants, the relevant products and the coolant. The bipolar unit of the invention is characterised in that each of the two external surfaces of the plates is in a uniform and continuous electrical contact with a planar, conductive and porous current collector. According to one preferred embodiment of the invention, the plates are provided with corrugations also in the peripheral zone, external to the cell active area, where the hydraulic sealing is accomplished by the coupling with suitable planar gaskets.

Under a further aspect, the invention consists of a fuel cell comprising a pair of said bipolar units with an interposed MEA assembly; the cell is characterised by a uniform electrical contact between the diffusion layer surfaces of the MEA assembly and the surfaces of the porous current collectors in contact with the plate external surfaces.

According to one preferred embodiment of the invention, only one of the metal plates delimiting the bipolar units is provided with corrugations.

According to another preferred embodiment of the invention, the corrugations of one or both plates of the bipolar unit are obtained by pressure moulding of planar sheets; the thickness of the corrugations is preferably comprised between 0.1 and 0.5 mm.

In one preferred embodiment, the connections between the respective internal surfaces of the plates of the bipolar unit define channels for the passage of the coolant. Such connections are optionally continuous making the channels and the peripheries of the openings for the circulation of the gaseous reactants, the products and the coolant hydraulically impervious; the continuous connections may for instance be obtained by laser or braze welding.

In one preferred embodiment, the porous collector in contact with the external surfaces of the plates delimiting the bipolar unit is interpenetrated with the corrugations of the facing plate, and optionally secured by laser welding or by means of an optionally conductive adhesive.

The interpenetrated collector may be obtained by pressing of the porous planar collector on the corrugated plate facing surface, or by pressure moulding of the planar sheet of the facing plate and of the planar collector with simultaneous formation of the plate corrugations and interpenetration of the collector with the corrugations.

The porous collectors of the bipolar unit are materials known in the field of fuel cell construction, and may be selected from the group of foams, cloths, meshes and expanded sheets, sintered powders, taken as single pieces or variously overlaid and combined; the constituent material of collectors and plates is preferably selected from the group of stainless steels, nickel alloys and titanium.

In one preferred embodiment of the invention, the planar sheet of the bipolar unit plates has a thickness comprised between 0.05 and 0.2 mm, while the foam of the porous collector has an initial thickness comprised between 0.5 and 5 mm and is compressed up to a final thickness comprised between 0.2 and 0.5 mm with pores having an average diameter of 0.2 to 0.5 mm.

The plates and the porous collectors are optionally provided with an electrically conductive corrosion-protective film selected from the group comprising the platinum group metals or oxides thereof optionally added with adhesion promoters selected from the group of niobium, titanium, tantalum and zirconium; in one preferred embodiment, the protective film comprises ruthenium or ruthenium oxide.

In one preferred embodiment of the invention, the protective film has a thickness comprised between 0.1 and 1 micrometres and its porosity is not higher than 50%.

The finding of the present invention will be described making reference to the following figures, which have a merely exemplifying purpose:

FIG. 1: front-view of an embodiment of the first plate delimiting the bipolar unit of the invention, provided with corrugations.

FIG. 2: front-view of an embodiment of the second plate delimiting the bipolar unit of the invention, free of corrugations.

FIG. 3: view of the lateral section along the line X-X of the first plate provided with corrugations of FIG. 1.

FIG. 4a: side-view of the abutment of the first corrugated plate of FIG. 1 along the line X-X to the second smooth plate of FIG. 2 along the line Y-Y.

FIG. 4b: side-view of the assembly formed by the abutment of FIG. 4a with indication of the fixing points obtained by laser or braze welding.

FIG. 5: front-view from the smooth plate side of the assembly of FIG. 4b with the hatched lines indicating the track of the laser or braze welding ensuring the sealing of the openings and of the internal channels (not visible) for the passage of the gaseous reactants and the coolant.

FIG. 6: side-view of the complete bipolar unit wherein the assembly of FIG. 4b is coupled to conductive and porous current collectors, with the corrugations of the first plate interpenetrated in the facing collector.

FIG. 7: side-view of a fuel cell comprising two bipolar units of the type illustrated in FIG. 6 with an interposed MEA element.

As it will be made clear by the present description, the bipolar unit of the invention suitable for being used in conjunction with MEA elements for the construction of fuel cells, in particular membrane fuel cells, comprises the assembly consisting of a first corrugated plate and a second smooth or optionally also corrugated plate, said plates being provided with external and internal surfaces and with connections between the relevant facing internal surfaces, and a pair of porous collectors, wherein the corrugations of the first plate are interpenetrated in the relative collector. The plates and the collectors are produced with electrically conductive materials inert to the corrosive action of the process fluids.

The first corrugated plate delimiting the bipolar unit of the invention is represented in FIG. 1, wherein (1) indicates the internal face of the plate to be contacted by an appropriate second plate, (2) the opening for the admission of the coolant, (3) the channels for the passage of the coolant corresponding to corrugations obtained by pressure moulding of a planar sheet (5), whose non-moulded portion (4) forms the wall of the channels, (6) and (7) the openings for the two gaseous reactants (oxidant and fuel), (8) and (10) the distributing channels of the first and of the second gaseous reactant respectively, also corresponding to corrugations obtained by pressure moulding of the planar sheet, (9) holes suitable for distributing the first of the gaseous reactants to the relevant first porous collector in contact with the plate external face (not visible) with the hatched line (12) defining the outline thereof, (11) the holes required for housing the compression tie-rods needed for assembling multiplicities of individual cells.

The sheet is usually a stainless steel or nickel alloy or titanium sheet and has a thickness comprised between 0.05 and 0.2 mm, while the corrugations obtained by moulding have a height falling in the range of 0.1 to 0.5 mm.

FIG. 2 represents a front-view of the second plate delimiting the bipolar unit of invention in the smooth plate version, obtained from the planar sheet by simple punching and also characterised by an internal face (not visible) directed to contact the internal face of the first plate and by an external face (13), with the holes (14) suitable for distributing the second of the gaseous reactants in the relevant second porous collector in contact with said external face. The other details in common with the first plate are indicated with the same reference numerals.

The structure of the first plate is more easily understood by aid of FIG. 3 which reproduces the side-view along the line X-X of FIG. 1: the hatched arrows indicate the direction of the punches in the moulding process of the corrugations labelled with the numeral (4) also identifying the corresponding channels. The details in common with FIG. 1 are indicated with the same reference numerals.

FIG. 4a shows, in a side-view along the lines X-X and Y-Y of FIGS. 1 and 2, the abutment, schematised by the two hatched arrows, of the internal surfaces of the first corrugated plate and of the second smooth plate immediately before the operation of fixing and sealing of the channels and the openings.

FIG. 4b represents the assembly (15) obtained by the abutment of FIG. 4a after the operation of fixing and sealing of the channels and the openings at the points (16) indicated by the hatched arrows.

Figure 1:
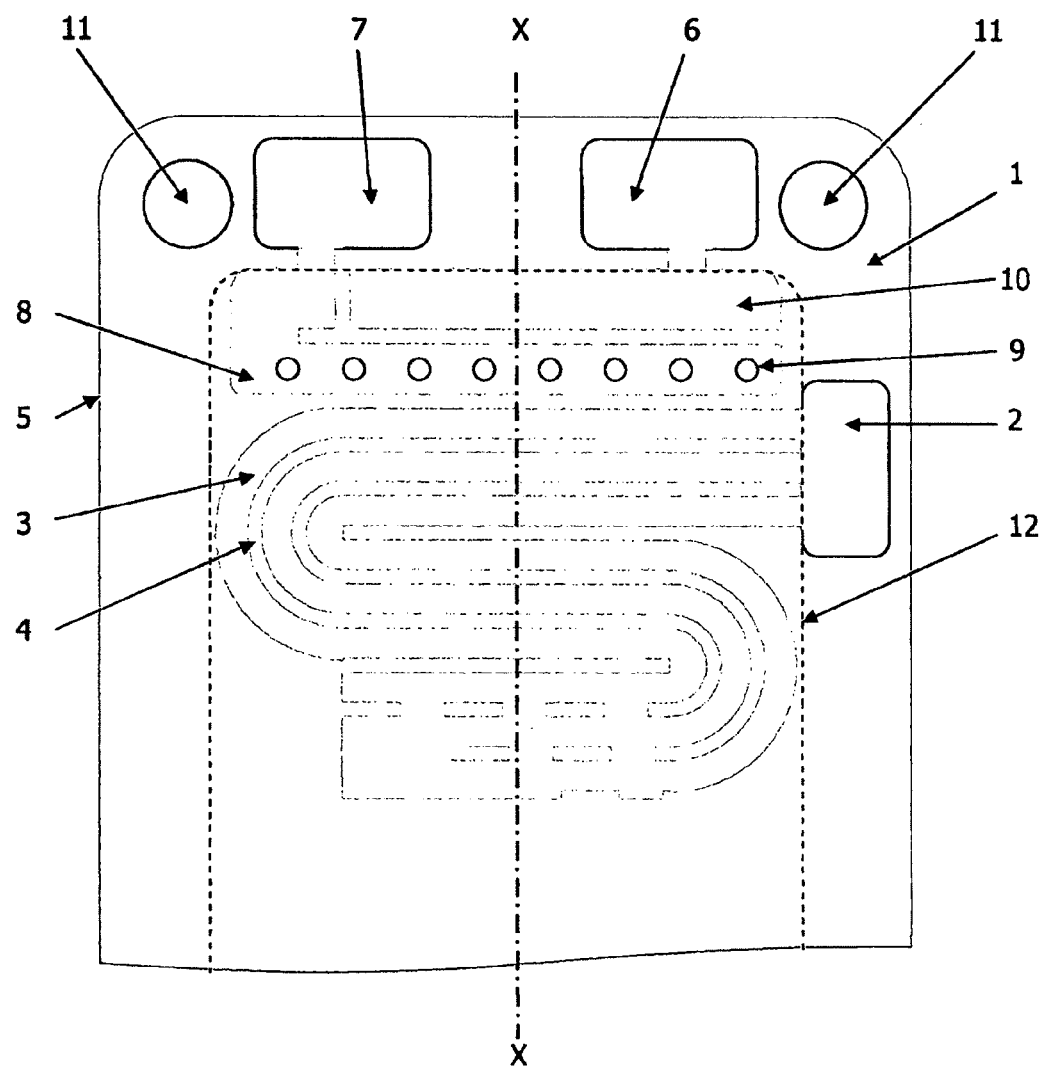
Figure 2:
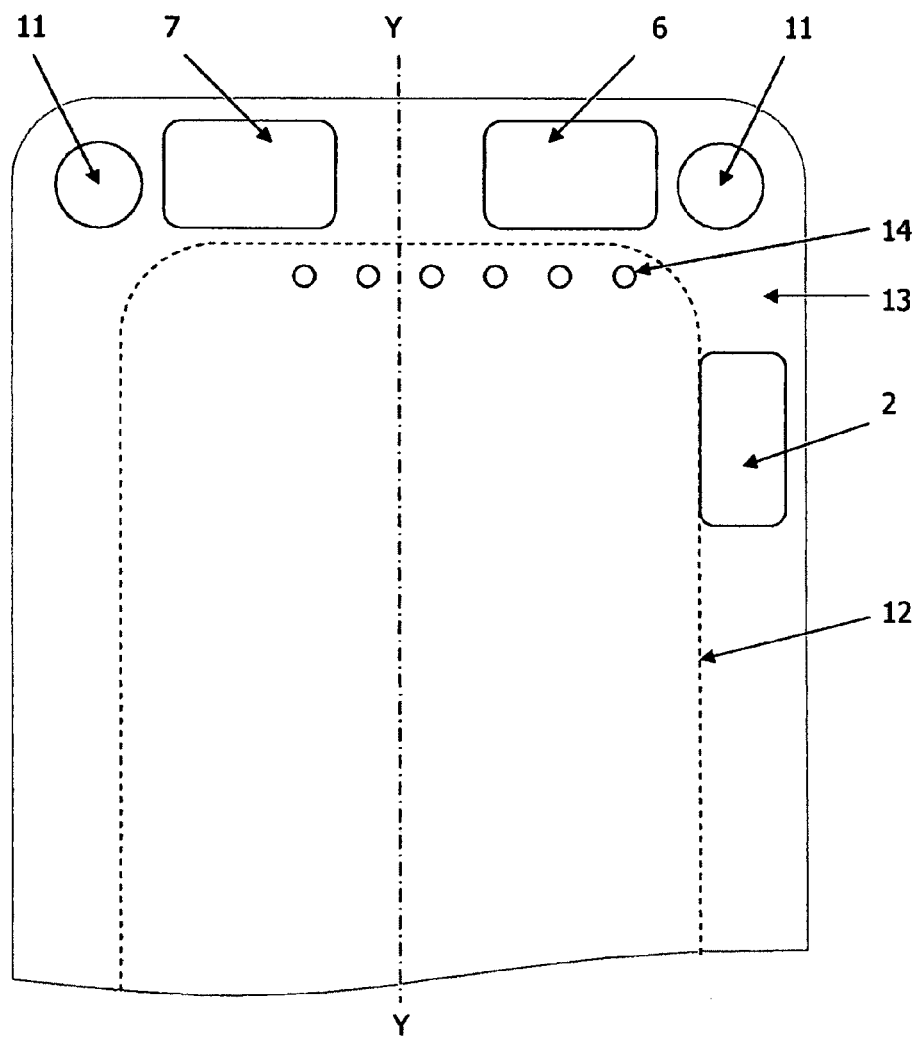
Figure 5:
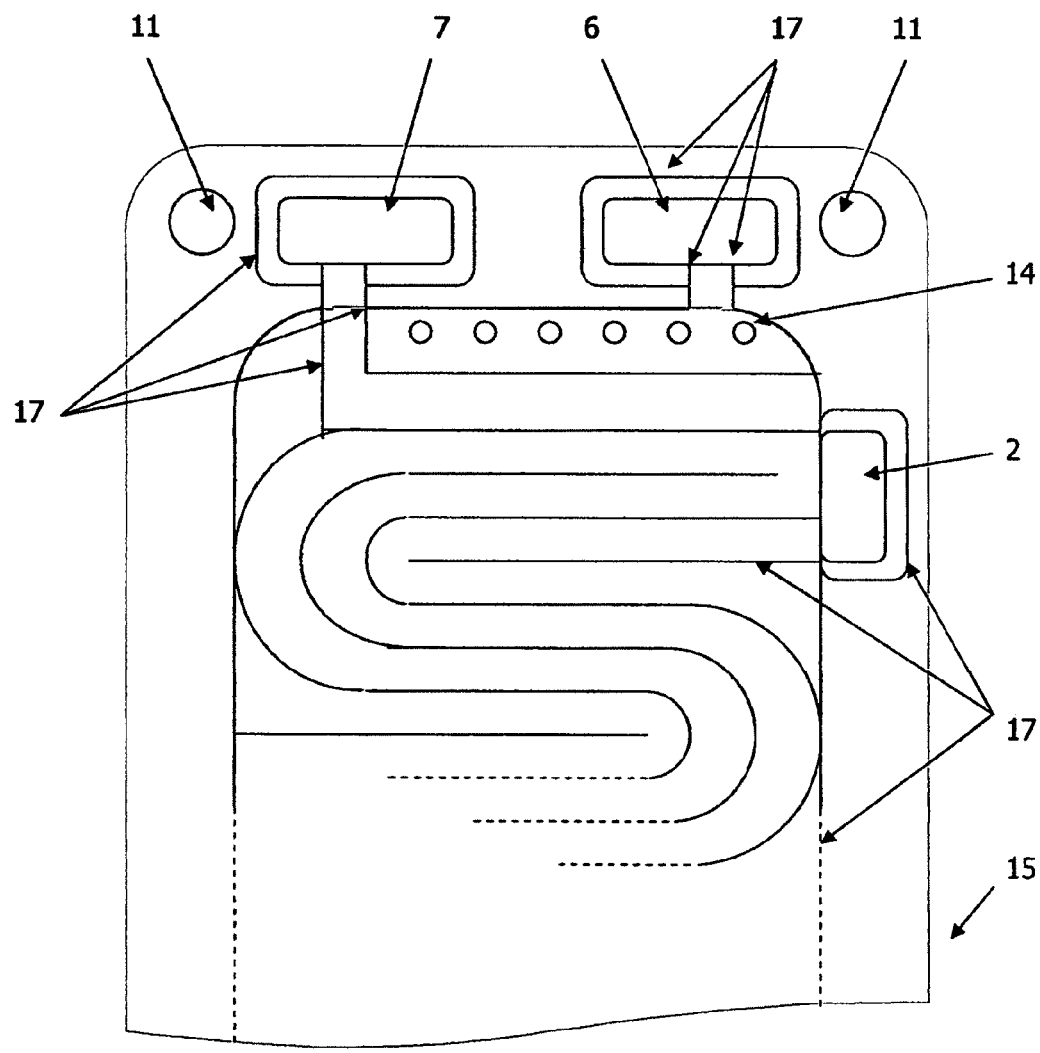

FIG. 5 represents the front-view of assembly (15) in which the fixing tracks of the two plates are indicated by reference numeral (17). For a correct functioning of fuel cells constructed by making use of assembly (15), it is essential that the channels and openings be sealed in order to prevent gas or coolant leakages between the channels themselves, between openings and between channels and openings: it is therefore necessary that tracks (17) be continuous as indicated in the figure and free of defects such as microporosities. Adequate results are achievable by means of the laser welding technique which allows to obtain extremely thin tracks, positioned with high precision by automated equipments able to guarantee a high reproducibility associated with remarkable production speeds. An interesting alternative is represented by a suitable adaptation of the braze welding techniques currently used for the production of plate exchangers.

Figure 6:
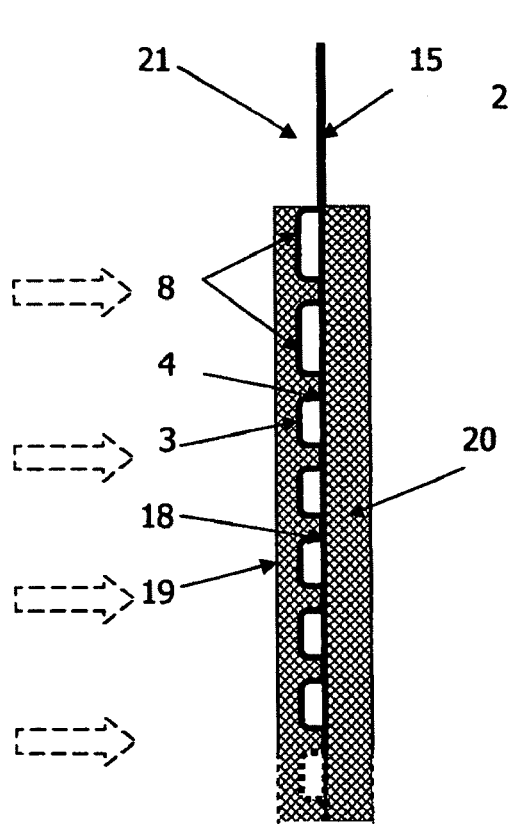

The assembly (15) of FIG. 4b constitutes the basis for the final manufacturing step which leads to the bipolar unit of the invention: this stage, schematised in FIG. 6, provides that the first porous collector (18) be pressed as sketched by the hatches arrows against the surface of the assembly (15), particularly against the external corrugated surface, so as to be interpenetrated in the gaps (19) between each pair of adjacent corrugations forming a single object, especially characterised by the continuity of electrical contact between the whole corrugated external surface of assembly (15) and the body of the collector itself. The object thus obtained is finally coupled on the external surface thereof, represented by surface (13) of the smooth plate, with the second porous collector (20) secured by welding tracks, optionally discontinuous tracks, or alternatively with adhesive, preferably adhesive of the conductive type, for instance graphite-loaded epoxy cement, applied by spots or alternatively spread as a thin veil on the whole contact surface. Similar methods may be also applied to the first porous collector after pressing in order to better establish the fixing. The overall operation of compression of the first collector and securing of the second collector on the assembly (15) allows obtaining a final monolithic object which constitutes the bipolar unit of the invention indicated by the reference numeral (21) in FIG. 6. As an optional alternative it is also possible to interpenetrate the collector and the corrugations by simultaneously carrying out the pressure moulding of a planar sheet in contact with a planar collector: the piece thus obtained is subsequently secured to the second plate and the obtained object is secured in its turn to the second collector thereby obtaining the bipolar unit of FIG. 6.

The collectors suitable for forming the bipolar unit of the invention must be characterised by electrical conductivity for a good current transmission, sufficient porosity to allow an easy flow and a homogeneous gaseous reactant distribution, and an adequate deformability in order to achieve a complete interpenetration with the corrugations of assembly (15). These requirements are presented by foams, cloths, sintered powders and multilayer packages of thin meshes and expanded sheets, produced with stainless steels of austenitic and ferritic type, nickel-chromium alloys or titanium, also employed as materials for the solid sheets used in the manufacturing of the corrugated and smooth plates. Such materials are characterised by a good inertia against the aggressiveness of the fluids present inside the fuel cells and they normally neither give particular problem of deterioration nor a harmful release of poisonous metal ions. In any case, for particularly critical applications it is possible to further increase the chemical inertia through the application of thin protective conductive layers based on metals of the group of platinum or oxides thereof, such as for instance ruthenium or ruthenium oxide, optionally added with adhesion promoters selected from the group of niobium, titanium, tantalum and zirconium oxides. To limit the costs, the protective films have thicknesses as low as 0.1-1 micrometres: it was found that also with these minimal thicknesses, the films are in any case capable of performing their task of ensuring a low contact resistance and of highly limiting, if not of cancelling, the metal ion release, provided their porosity is not higher than 50%.

The collectors are initially characterised by pores with an average equivalent diameter preferably comprised between 0.2 and 0.5 mm and thickness of 0.5-5 mm, which is indicatively reduced to 0.2-0.5 mm after compression against the corrugated surface of assembly (15).

Figure 7:
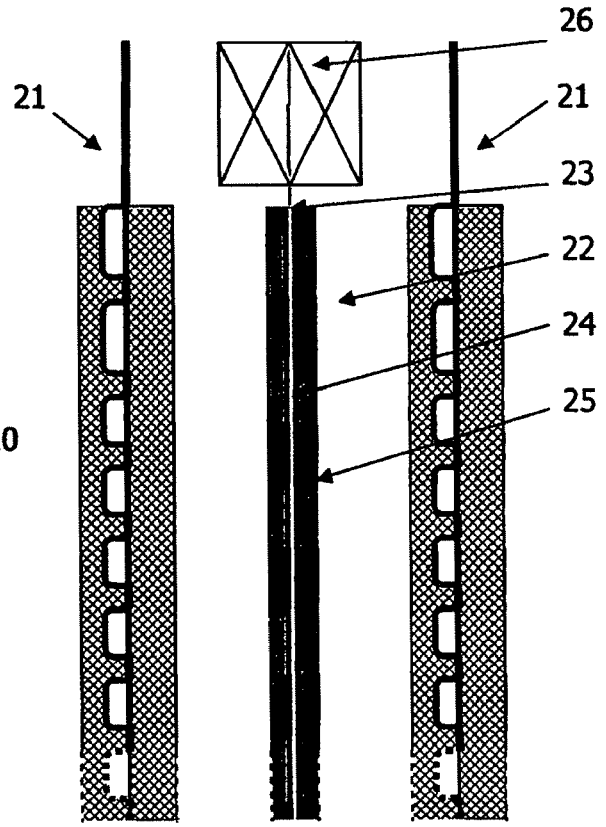

As indicated in FIG. 7, a pair of bipolar units (21) of FIG. 6 is used in conjunction with a MEA element to form an elementary fuel cell: the MEA element comprises an ionomer membrane (23), two films (24) consisting of catalyst microparticles and optionally a suitable binder, two gas diffusion layers (25) as known in the art. The MEA element is completed by a system of integrated peripheral gaskets (26) directed to seal the various openings in order to prevent gas and coolant leakages to the external environment and between the openings themselves. In the elementary cell which is formed by abutting the components shown in FIG. 7 the channels formed by the corrugations, crossed by the coolant, ensure the optimal control of the operative temperature. The gas reactants flow through the first and the second collector and are homogeneously distributed to the gas diffusion layers. Such condition is important to obtain also a uniform distribution of the electric current on the catalytic films, but is not sufficient: the uniformity of distribution of the electric current, fundamental to obtain the best voltage performances and to achieve long operating lifetimes, also requires that the electrical contact between bipolar units and MEA elements be uniform and continuous. While in the prior art wherein bipolar units only provided with grooves or corrugations are used the electrical contact is invariably established between the apexes of the grooves or corrugations and the MEA elements, and is therefore of the discontinuous type with a negative repercussion on the electric current distribution, the bipolar unit of the present invention ensures a complete electrical contact uniformity and continuity between both of the bipolar unit surfaces, the porous collectors and the MEA elements.

The analysis of FIG. 7 finally demonstrates how the use of MEA elements comprising membrane, catalytic films, gas diffusion layers and gasket frames in conjunction with the monolithic bipolar units of the invention leads to stack assembly procedures comprising a multiplicity of extremely simplified fuel cells, certainly compatible with the low cost mass production procedures. Furthermore the stacks consisting of MEA elements and bipolar units according to the invention end up being very compact as a consequence of the reduced thicknesses characterising the individual elementary cells, typically comprised between 1 and 2 mm. Such compact stacks are of great interest for all the automotive applications, where the weights and particularly the volumes are very critical.

As it is apparent to one skilled in the art, other changes or modifications may be introduced to the previous disclosure, that shall not be intended as a limitation of the invention which may be used according to different embodiments without departing from the scopes thereof and whose extent is univocally defined by the appended claims.

Throughout the description and claims of the present application, the term "comprise" and variations thereof such as "comprising" and "comprises" are not intended to exclude the presence of other elements or additives.

The invention claimed is:

1. A method of manufacturing a bipolar unit for fuel cells, the bipolar unit comprising a first metal plate and a second metal plate, each of the first metal plate and the second metal plate provided with an external surface and an internal surface, connections between said respective internal surfaces, openings for the transmission of gaseous reactants and a coolant, at least said first metal plate being provided with corrugations forming a first channel comprised between said internal surfaces directed to ensure the passage of the coolant, wherein the external surface of said first metal plate is in uniform electrical contact with a first facing conductive and porous current collector and the external surface of said second metal plate is in uniform electrical contact with a second facing conductive and porous current collector, wherein said uniform electrical contact between the external surface of said first metal plate and said first facing porous current collector is given by the interpenetration between said corrugations and said first facing porous current collector, the method comprising formation of said corrugations by pressure molding of a planar sheet.

2. The method of claim 1 wherein said planar sheet has a thickness between 0.05 and 0.2 millimeters.

3. The method of claim 1 comprising obtaining said interpenetration by pressure molding of said first porous collector on said first metal plate provided with corrugations.

4. The method of claim 1, comprising obtaining said interpenetration by simultaneous pressure molding of a planar sheet and of said first porous collector.

* * * * *